United States Patent [19]
Porter et al.

[11] Patent Number: 5,410,545
[45] Date of Patent: Apr. 25, 1995

[54] LONG-TERM STORAGE OF CONTROLLER PERFORMANCE

[75] Inventors: Brian Porter, Marlboro; Russell L. Myers, Grafton, both of Mass.

[73] Assignee: Digital Equipment Corporation, Maynard, Mass.

[21] Appl. No.: 920,766

[22] Filed: Jul. 28, 1992

[51] Int. Cl.⁶ .............................................. G06F 11/00
[52] U.S. Cl. .................................... 371/21.6; 371/29.1
[58] Field of Search .................... 371/10.1, 21.1, 21.2, 371/21.6, 29.1, 40.1, 40.4; 395/575

[56] References Cited

U.S. PATENT DOCUMENTS

| | | | |
|---|---|---|---|
| 4,498,146 | 2/1985 | Martinez | 364/900 |
| 5,245,615 | 9/1993 | Treu | 371/16.5 |
| 5,291,494 | 3/1994 | Bruckert et al. | 371/11.3 |

Primary Examiner—Vincent C. Canney
Attorney, Agent, or Firm—Rama B. Nath; Ronald C. Hudgens; Arthur W. Fisher

[57] ABSTRACT

A memory controller having a non-volatile memory is disclosed herein. The memory controller forms part of a computer system that includes a program for accessing the non-volatile memory. When memory errors are detected, data correlative to the detected memory errors, such as error syndromes, is stored in the non-volatile memory. Preferably, during each operating session, the area of the non-volatile memory designated for this type of storage is copied into volatile memory. The volatile memory is updated during the operating session and then copied back to the non-volatile memory when the operating session is terminated. Technicians may access the non-volatile memory to study the error history for diagnostic or design purposes.

14 Claims, 10 Drawing Sheets

LONG-TERM STORAGE OF CONTROLLER PERFORMANCE

BACKGROUND OF THE INVENTION

1. Field of the Invention

The present invention relates generally to memory controllers and, more particularly, to the long-term storage of detected memory errors.

2. Description of the Related Art

A memory controller makes a dynamic memory system appear static to the host processor. The controller refreshes the memory chips, multiplexes the row and column addresses, generates control signals, determines the pre-charge period, and signals the processor when data is available or no longer needed. Furthermore, memory controllers also coordinate memory sharing between multiple processors and often assist in the detecting and correcting of memory errors.

Ensuring data integrity is a major concern in large dynamic random access memory (DRAM) systems, particularly because of their susceptibility to soft errors caused by alpha-particle radiation. Various parity encoding techniques have been developed to detect and correct memory errors. The parity bits, often called check bits when used for error correction as well as detection, are stored in the dynamic memory array along with the associated data bits. When the data is read, the check bits are regenerated and compared with stored check bits. If an error exists, whether in the retrieved check bits or in the retrieved data bits, the result of the comparison, typically called the syndrome, gives the location in the group of the bit in error.

The first step in rectifying such errors is to identify the error that occurred, as well as various signals present in the computing system at the time of the error. In some computing systems, these signals are generated by various circuit components and stored in one or more control and status registers, typically called "CSRs". For example, a typical CSR might be provided with information regarding some of the following items: an indication of what type of error occurred, the memory address that was being written to or read from when the error occurred, a number of check bits associated with the data that was being written to or read from memory when the error occurred, and the syndromes associated with the data that was being written or read at the time of the memory error.

Although CSRs are useful in solving memory problems in many applications, there are other applications in which further improvement would be helpful. Typically, one CSR is provided for each "memory module", wherein a memory module includes a collection of cooperating memory banks. Each time a new memory error occurs, the data associated with that error is written into the CSR associated with the memory module where the error occurred. If at the time of the new memory error the CSR already contains data corresponding to a previous error, data pertaining to the new error cannot be stored, and, at best, an error overflow bit can be set. Accordingly, a CSR at any given time is more likely to contain data associated with a frequently occurring memory error than data from an infrequent error. As a result, central processing components that utilize information obtained from CSRs are sometimes unable to detect the infrequent errors, thereby reducing the effectiveness of the fault management program's ability to process multiple faults. The overall effect is that the computing system's reliability is diminished.

The correctable data memory errors described above are only one class of three possible memory error classes. The other two classes are uncorrectable data memory errors and memory controller errors. On occasion, the type or class of error will require the replacement of the entire main memory, a particular memory bank, and/or the memory controller. For example, uncorrectable memory errors or memory controller errors may require the replacement of the memory module. Module replacement might also be required for frequently recurring correctable memory errors. These modules are typically returned to the manufacturer or to a repair facility where highly trained technicians or engineers test the memory to determine where and why the errors occurred.

Error logging features assist the technicians and facilitate the determination of the cause of the errors. A typical error logging feature may require tagging single bit errors and uncorrectable errors during memory read transmission from a memory subsystem. The memory controller may also save syndrome bits for the first memory read error and the error address for error logging and servicing. The memory controller will retain this information until the first error is serviced by the operating system. The memory controller may also contain one or more CSRs that are used for diagnostic purposes when the technician performs simulated memory reads in an attempt to reproduce the error. However, most errors are caused by transient faults. Thus, many errors are simply not reproducible.

Computer manufacturers spend many millions of dollars each year on memory module repair. Not uncommonly, the highly trained repair technicians fail to reproduce errors in a large percentage of the memory modules returned to repair centers throughout the world. Clearly, if a memory module fails in service, and this failure cannot be duplicated in a laboratory environment, designers cannot make effective modifications to the memories to avoid future failures.

The present invention is directed to overcoming, or at least reducing the effects of, one or more of the problems set forth above.

SUMMARY OF THE INVENTION

By storing data that identifies a failing component or that verifies that a failure has occurred, technicians have access to valuable information which can substantially reduce repair costs. By collecting and storing performance data of a memory module, empirical data can be compiled pertaining to the functional operation of the module. This data can be used to identify and quantify problems or potential areas for improvement for the purpose of enhancing the existing or new designs. Furthermore, when this data indicates that memory errors have occurred, but initial testing does not indicate any errors, testing procedures may be modified in an effort to accurately reproduce the stored errors. Much information relating to errors may be stored, such as information about how the operating system handles errors and about specific errors in individual components.

In accordance with one aspect of the present invention, there is provided a memory controller having a non-volatile memory for storing information correlative to a detected memory error. The memory controller includes a gate array that can be coupled to a main memory unit. The gate array delivers control signals and write data to the main memory unit and receives read data from the main memory unit. The memory controller also includes an interfacing unit that is coupled to the gate array and that can be coupled to a system bus. The interfacing unit delivers signals from the system bus to the gate array and vice versa. The non-volatile memory is coupled to the gate array.

In accordance with another aspect of the present invention, there is provided a computer system having a program for collecting a detected error state and storing data correlative to the detected error state in a non-volatile memory. The computer system includes a central processing unit that is coupled to a system bus and that is capable of delivering signals to and receiving signals from the system bus. A memory controller is coupled to the system bus and is also capable of delivering signals to and receiving signals from the system bus. The memory controller contains a non-volatile memory. A main memory is coupled to the memory controller. The main memory is capable of delivering signals to and receiving signals from the memory controller. The program is executed by the central processing unit so that the program collects a detected error state and stores data correlative to the detected error state in the non-volatile memory.

In accordance with a further aspect of the present invention, there is provided a method for recording a state of a memory error in a computer system. The method includes the steps of detecting a memory error, producing an error state in response to detecting the memory error, collecting the error state, processing the error state, storing the error state in non-volatile memory, and resetting the error state.

In accordance with yet another aspect of the present invention, there is provided a method for recording a state of a memory error in a computer system. An area of a non-volatile memory is designated for storage of data correlative to a memory error. This designated area is copied into a volatile memory. When a memory error is detected, data correlative to the memory error is stored in the area of the volatile memory. Thereafter, the area in the volatile memory is copied into the non-volatile memory for storage of the data correlative to the memory error.

BRIEF DESCRIPTION OF THE DRAWINGS

The foregoing and other advantages of the invention will become apparent upon reading the following detailed description and upon reference to the drawings in which.

Figure 1:
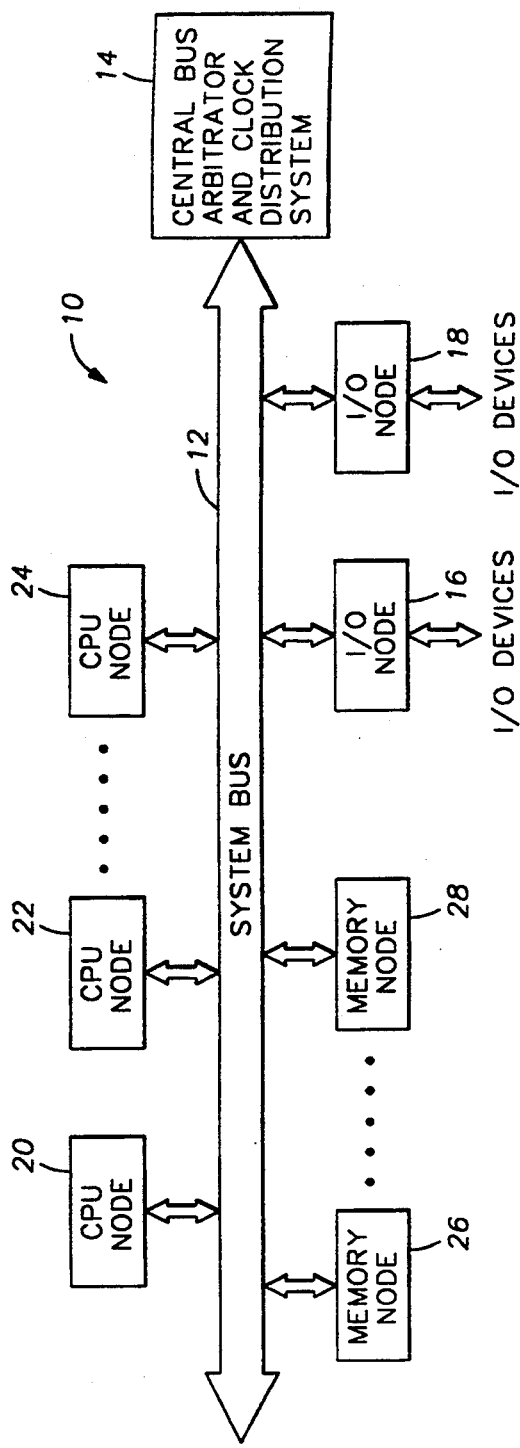
FIG. 1 illustrates a block diagram of a computer system in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF THE PREFERRED EMBODIMENTS

Turning now to the drawings and referring initially to FIG. 1, a computer system is illustrated and generally designated by a reference numeral 10. The computer system 10 is of a type that may use the error logging apparatus and method set forth herein. The computer system 10 is centered about a system bus 12 for access to various system resources. The system bus 12 includes a central bus arbitrator and clock distribution system 14 that controls access to these various system resources. Preferably, the system bus 12 supports up to sixteen possible nodes of which two nodes can be input/output (I/O) nodes 16 and 18, and the remaining fourteen possible nodes can be any combination of CPU (central processing unit) nodes, such as CPU nodes 20, 22, and 24, or memory nodes, such as memory nodes 26 and 28.

A CPU may be, for example, of the VAX architecture as described by Levy and Eckhouse in "Computer Programming and Architecture: The VAX", 2d ed., Digital Press, 1989. A single-chip CPU of the VAX architecture is disclosed in U.S. Pat. No. 5,006,980, issued to Sander, Uhler, and Brown, and assigned to Digital Equipment Corporation. A CPU may also be of an advanced 64-bit RISC architecture as disclosed in co-pending application Ser. No. 547,630, filed Jun. 29, 1990, also assigned to Digital Equipment Corporation. Alternatively, of course, the CPU may be of many other types, such as the Intel 386 or 486 architecture, or the MIPS R3000 or R4000 RISC architecture. The system bus 12 may be any of the standard bus specifications used for any of the many commonly-used CPUs, but is, in this example, a VAX/XMI bus.

Figure 2:
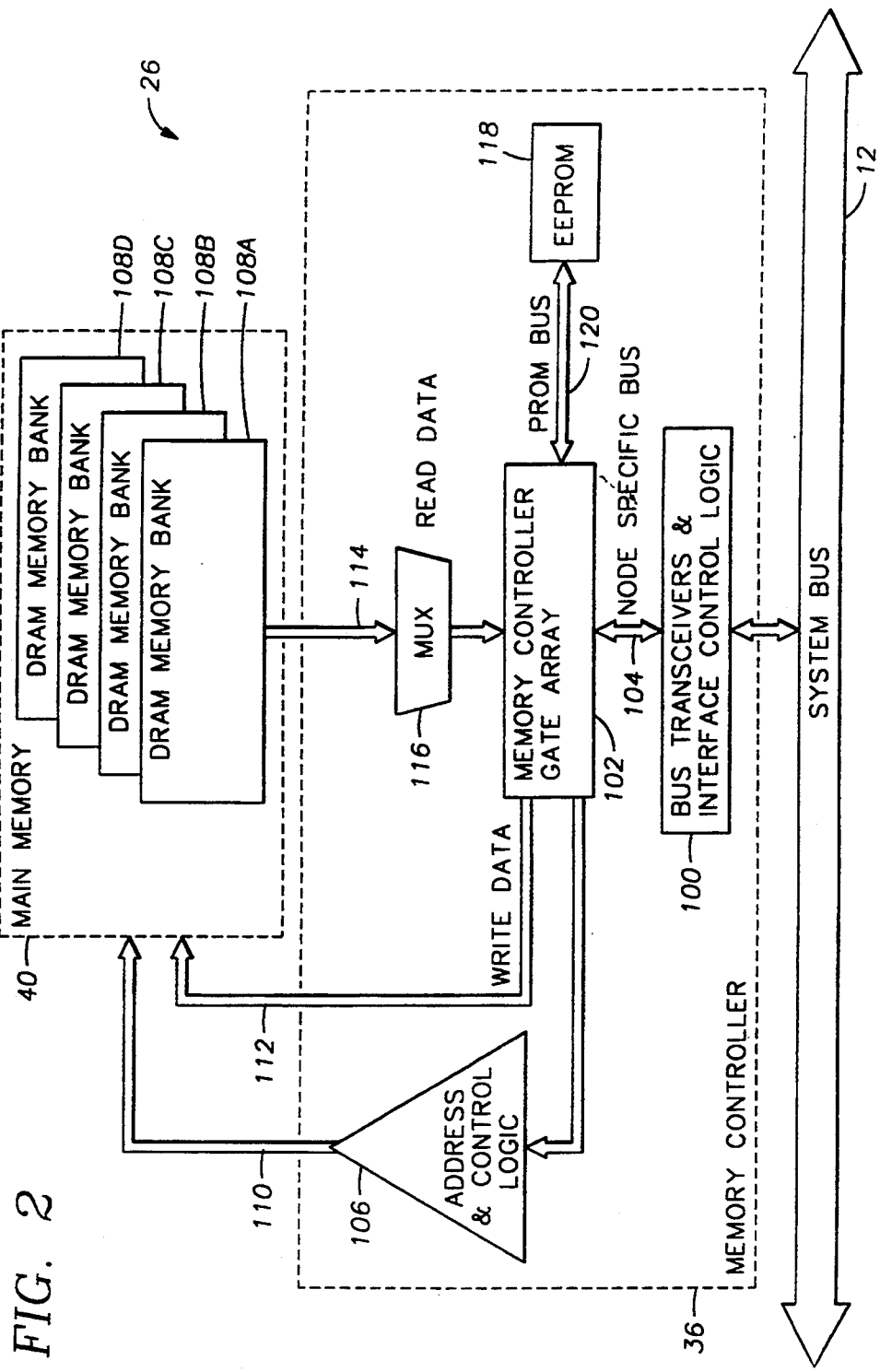
FIG. 2 illustrates a detailed block diagram of a memory node having a memory controller coupled to non-volatile memory, such as an electrically erasable programmable read only memory (EEPROM), for logging errors in accordance with the present invention.

A memory node 26 is illustrated in greater detail in FIG. 2. A memory node, such as memory node 26, may include a memory controller 36 and a main memory 40 that are coupled together by a memory bus. The elements of the memory controller 36 are illustrated as functional blocks. The memory controller 36 interfaces to the system bus 12 via bus transceivers and interface control logic 100, which includes clock distribution, latches, transceivers, and node control logic. The internal memory control is provided by logic within the memory controller gate array 102 which interfaces to the system bus 12 via a node specific bus 104 and the bus transceivers and interface control logic 100. The memory controller gate array 102 is coupled to address and control logic 106 that transmits address and control signals via the lines 110 to the main memory 40, which includes a plurality of DRAM memory banks 108A, 108B, 108C, and 108D. The memory controller gate array 102 also sends write data to the main memory 40 via the lines 112. The memory controller 36 receives read data from the main memory 40 on the bus 114 which are coupled to a multiplexer 116.

The memory controller 36 also includes a non-volatile memory, such as a EEPROM 118 that is coupled to the memory controller gate array 102 via a PROM bus 120. The EEPROM 118 is a non-volatile read-write storage device that is accessible to the operating system used by the computer system 10. The EEPROM 118 is typically used for a number of functions that assist normal operation of the computer system 10, such as self-testing routines. However, in the preferred embodiment, information correlative to detected memory errors is also logged in the EEPROM 118. For error logging, the operating system uses an area in the EEPROM 118 designated for long term storage of performance data related to the main memory 40 and the memory controller 36. The preferred operating system is version V5.5 of VMS.

Figure 3:
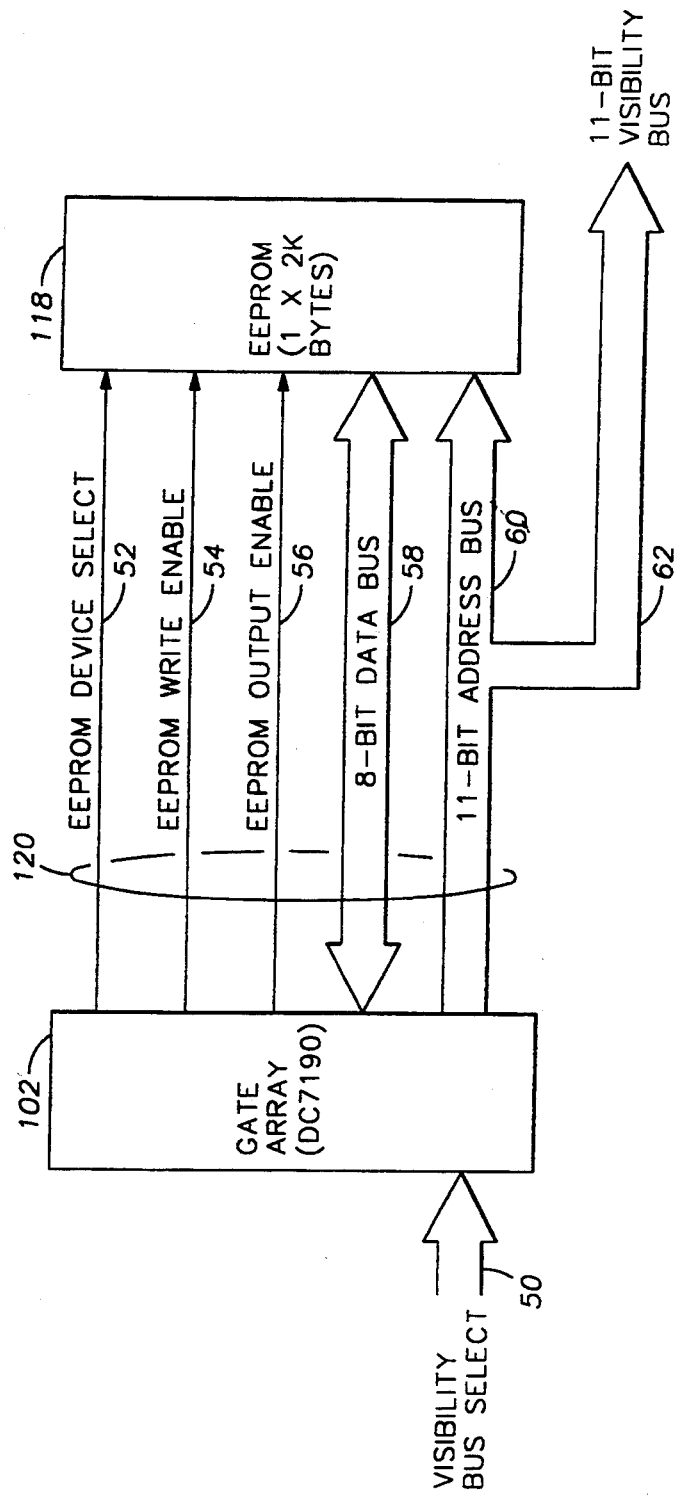
FIG. 3 illustrates a block diagram of a memory controller being coupled to a non-volatile memory.

FIG. 3 illustrates the gate array 102, the EEPROM 118, and the PROM bus 120 in greater detail. Preferably, the gate array 102 is a Model No. DC7190 gate array available from Digital Equipment Corporation, and the EEPROM 118 is preferably one byte wide and 2K bytes long. A visibility bus select bus 50 is coupled to the gate array 102. The bus 50 is used to examine the internal state of the gate array 102 when the module is inserted in a test station. The gate array 102 delivers control signals to the EEPROM 118 on lines 52, 54, and 56. The line 52 carries a device select signal to the EEPROM 118, the line 54 carries a write enable signal to the EEPROM 118, and the line 56 carries an output enable signal to the EEPROM 118. Data is transferred back and forth between the gate array 102 and the EEPROM 118 on a data bus 58. In the preferred embodiment, the data bus 58 is 8 bits wide. The gate array 102 delivers an address to the EEPROM 118 via an address bus 60. In the preferred embodiment, since the EEPROM 118 is 2K bytes long, the address bus 60 is 11 bits wide. A visibility bus 62 branches off from the address bus 60 and is used in conjunction with the bus 50 for testing purposes.

Figure 4:
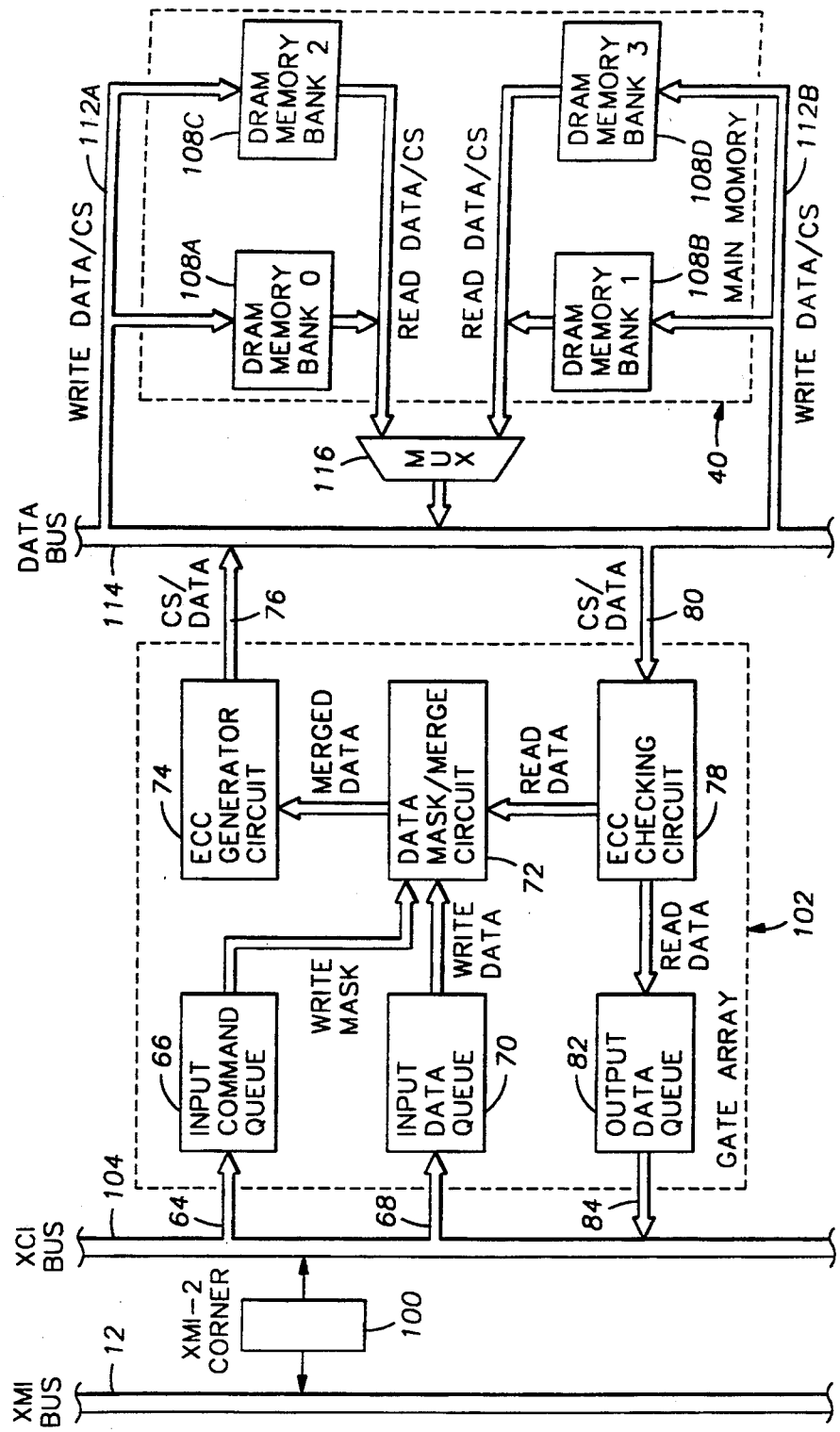
FIG. 4 illustrates a block diagram of a memory controller in accordance with the present invention.

FIG. 4 illustrates a functional block diagram of the gate array 102. In the preferred system, the memory controller 36 is an MS65A memory controller available from Digital Equipment Corporation. The XMI bus corresponds to the system bus 12, the XMI-2 Corner corresponds to the logic block 100, and the XCI bus corresponds to the node specific bus 104. The gate array 102 receives input commands on the bus 64 and stores these commands in an input command queue 66. The gate array 102 receives input data on the bus 68 and stores this data in an input data queue 70. The write command and the write data are transferred from the respective queues 66 and 70 to a data mask/merge circuit 72. The data mask/merge circuit 72 organizes the data in accordance with the write command and merges two 32-bit longwords into a 64-bit quadword. The merged data is then sent to an error-correcting code (ECC) generator circuit 74. The ECC generator circuit 74 calculates the ECC bits. The ECC bits are used to correct all single-bit memory errors and to detect double bit memory errors. In a preferred embodiment, the ECC generator circuit 74 uses a parity tree arrangement. The calculation of check bits using parity trees is sufficiently well-known in the art that an ordinarily skilled artisan would be able to design an arrangement of parity trees suitable for the check-bit calculation performed by the ECC generator circuit 74. The ECC bits are added to the merged data to produce a full data word that includes the ECC bits. In this embodiment, the circuit 74 generates eight check bits that are combined with the 64-bit data to form a full data word having 72 bits. This full data word is delivered to the data bus 114 via the bus 76. This full data word is then delivered over the lines 112A or 112B to the appropriate DRAM bank 108A–D.

When a read request requiring an access to the main memory 40 is being executed, the full data words are retrieved from the appropriate DRAM bank 108 A–D and delivered to the multiplexer 116. The multiplexer 116 controls delivery of the full data words to the data bus 114. These full data words are delivered to an ECC checking circuit 78 via a bus 80. The ECC checking circuit 78 uses the ECC bits in the full data word to determine if the actual data is correct. If the ECC checking circuit 78 finds an incorrect bit, it toggles the bit to correct the error. If more than one bit is incorrect, a fault is signalled, and the data is not corrected. However, assuming that the data is correct, or that it was correctable, the data is delivered to an output data queue 82 which delivers the data to the bus 104 via the bus 84.

If an error is detected, the ECC checking circuit 78 generates a syndrome, which is used by the circuit 78 to correct the detected error, if possible. The syndrome indicates, for example, which bits of the data were found to be erroneous. Furthermore, the circuit 78 identifies the memory bank 108A–D in which the read error occurred, and provides a signal identifying that memory bank. Also, the circuit 78 provides a signal indicating whether the memory error that has been detected is a correctable error or an uncorrectable error. This information and other information correlative to detected memory errors are preferably recorded in a non-volatile memory, such as the EEPROM 118, located in the associated memory node 26 or 28.

When the operating system is first initialized, any memory controllers in the computer system 10 are located and interrogated. The interrogation takes the form of probing specific addresses within the physical address space occupied by the EEPROM 118. The result of the probing determines whether the designated area within the EEPROM 118 has been initialized so that the performance data may be logged. If the area has been initialized, it is read into the main memory 40. However, if this area has not been initialized, a prototype area is created in the main memory 40.

Figure 5:
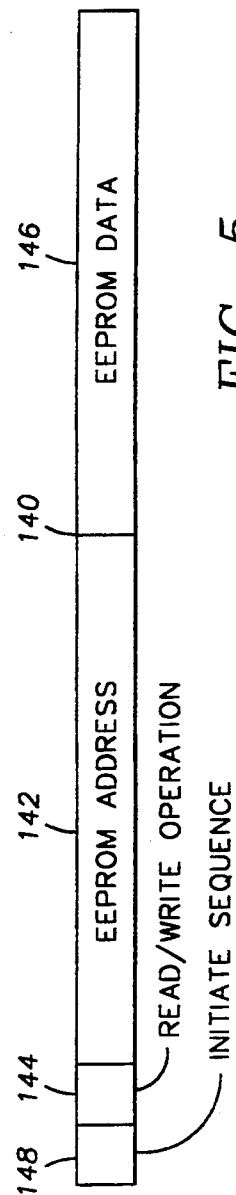
FIG. 5 illustrates an EEPROM control/data register used to access the EEPROM illustrated in FIG. 2.

The operating system accesses the EEPROM 118 through a single register 140, as illustrated in detail in FIG. 5. Although not shown, the register 140 is located in the gate array 102 to facilitate data transfer between the EEPROM 118, the gate array 102, and the main memory 40. The operating system supplies the EEPROM address to be accessed to the EEPROM Address Field 142, the manner of access, such as read or write, to the Read/Write Operation Field 144, the data (if it is a write command) to the EEPROM Data Field 146, and then sets the initiate bit in the Initiate Sequence Field 148. Once the initiate bit is set, the gate array 102 initiates a device access to allow the data to be written into or read from the EEPROM 118. For instance, if contents of the designated area in the main memory are being written back into the EEPROM 118, the data in the register 140 is transferred via bus 58 to the given address on bus 60 in the designated area in the EEPROM 118. Once the device access is complete, the initiate bit is cleared by the memory controller, thus signalling the operating system that the cycle is complete. Alternatively, if the main memory copy of the designated area is being made, the data in the EEPROM 118 is transferred via the bus 58 to the field 146 of the register 140. Then, once the device access is completed and the initiate bit is cleared by the memory controller, the operating system reads the data from the register 140 into the designated area in the main memory 40.

Figure 6:
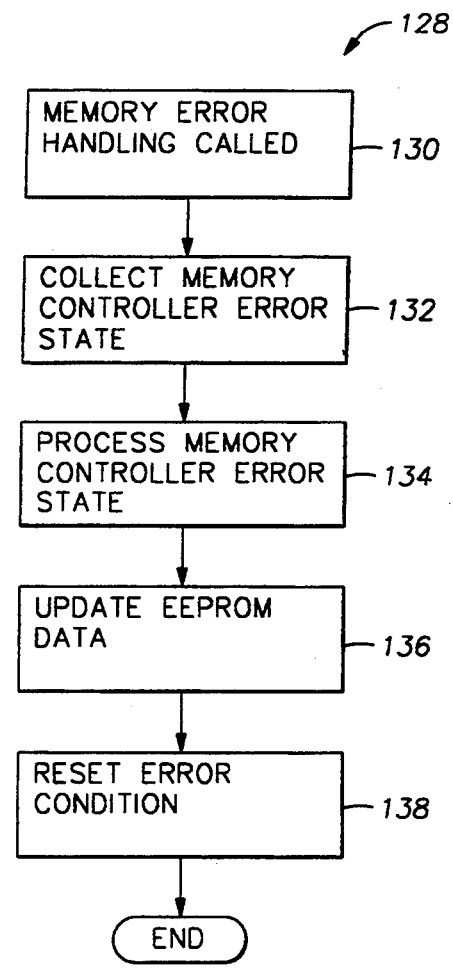
FIG. 6 illustrates a flowchart depicting the software control for logging errors in non-volatile memory.

When memory errors occur during an operating session, the memory controller 36 posts errors to the operating system, and a portion of the operating system is called to handle the errors. (Block 130). This portion is described in reference to the flowchart 128 of FIG. 6. As these errors are collected and processed by the operating system, an accounting of the type of errors is kept. (Blocks 132 and 134). This accounting causes the error to be reduced to a unique syndrome. The state that represents this syndrome within the main memory copy of the EEPROM storage area is updated as each error occurs. (Block 136). The run time of the computer system 10 is also preferably recorded in the EEPROM 118. Thus, the performance characteristics of the controller 36 and the error syndrome data can be plotted versus time. Finally, the program resets the error state and proceeds with the operating session. (Block 138).

Most errors are first noticed by the CPU nodes 20, 22, or 24. If the error handling capabilities of a CPU node 20, 22, or 24 determines that a memory state may be useful for correcting the current error condition, routines are called to collect that memory state. Regardless of what a CPU may do with the error state from a particular memory controller 36, the error conditions found are used to update the main memory copy of the designated area for the appropriate memory controller. Memory errors may be detected in other ways. For instance, VMS implements a once-per-minute scanning code on the VAX 6000 family of CPUs. Any error conditions found during this scan are also used to update the main memory copy of the designated area.

Figure 7:
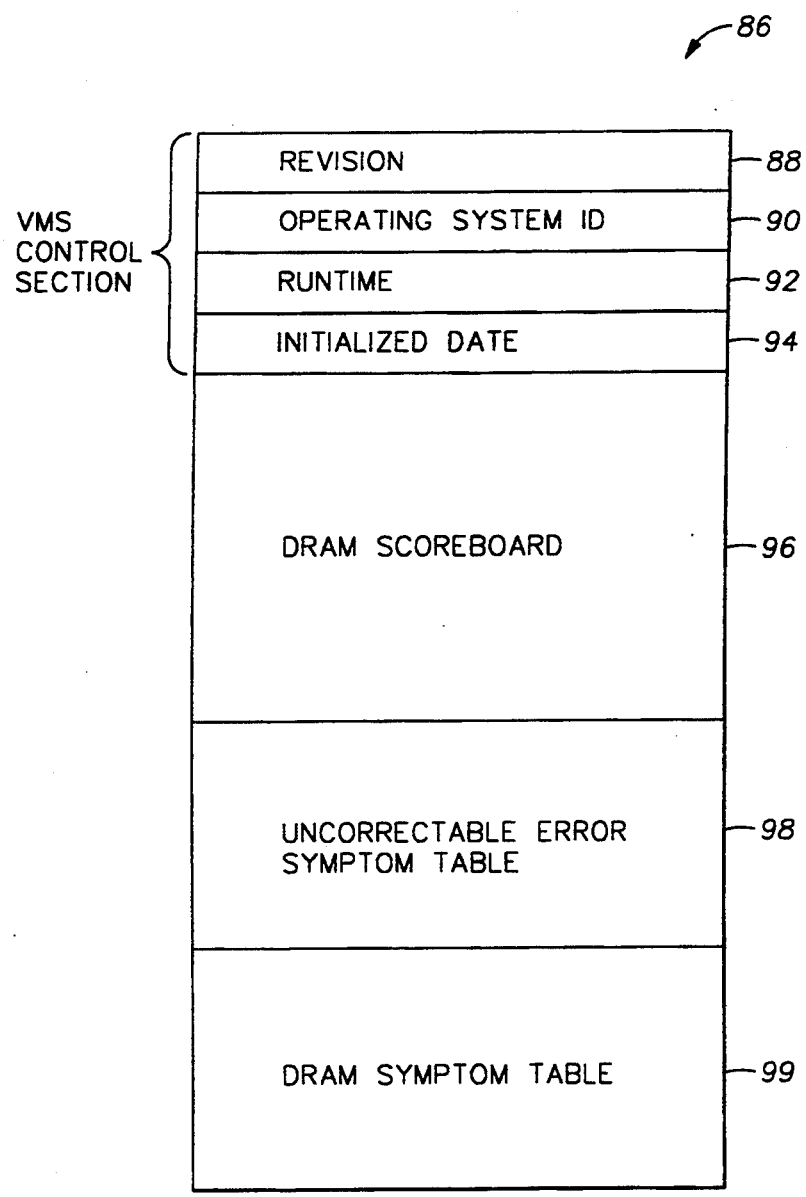
FIG. 7 illustrates preferred fields in an area of the non-volatile memory designated for storing information correlative to memory errors.

The operating system controls the format of the data structures in the designated area. When an error occurs, the operating system updates the appropriate field or fields. The area 86 designated within the EEPROM 118 for logging errors is illustrated in FIG. 7 and is preferably 1024 (decimal) bytes long. However, those skilled in the art will recognize that the number of errors and the types of errors largely determines the size of the designated area 86. If a more complicated memory controller were used, more memory controller errors would probably occur, and the size of the designated area 86 would be enlarged accordingly. The designated area 86 includes formatted data structures which may be randomly accessed by the operating system.

If the designated area 86 has not been initialized, the local memory copy is cleared and a header area is created. The header area takes the form of a REVISION field 88 and an OPERATING SYSTEM ID field 90. The REVISION field 88 describes the revision of the format of the designated area 86 as formatted by the operating system. The revision value is initially set to zero. The OPERATING SYSTEM ID field 90 describes the operating system that has currently formatted the designated area 86. For instance, VMS will format the designated area 86 if this field is zero. The value used by VMS to initialize the field 90 is one. If any other value is contained in the field 90, VMS will not use the designated area 86. For instance, if the designated area 86 has been initialized by another operating system, this area is not copied to the main memory 40 for use during the current operating session. However, if the designated area 86 has already been initialized by the current operating system, it is copied into the main memory 40 and made available for use during the current operating session.

The RUNTIME field 92 stores the total number of seconds that the designated area 86 has been in use since formatting. The RUNTIME field 92 is preferably one longword in length. The INITIALIZED DATE field 94 contains the date and time, preferably in VAX/VMS 64-bit format, when the system (in which this module resides and which initialized the designated area 86 for the first time) was booted. The length of the INITIALIZE DATE field 94 is preferably one quadword.

Figure 8:
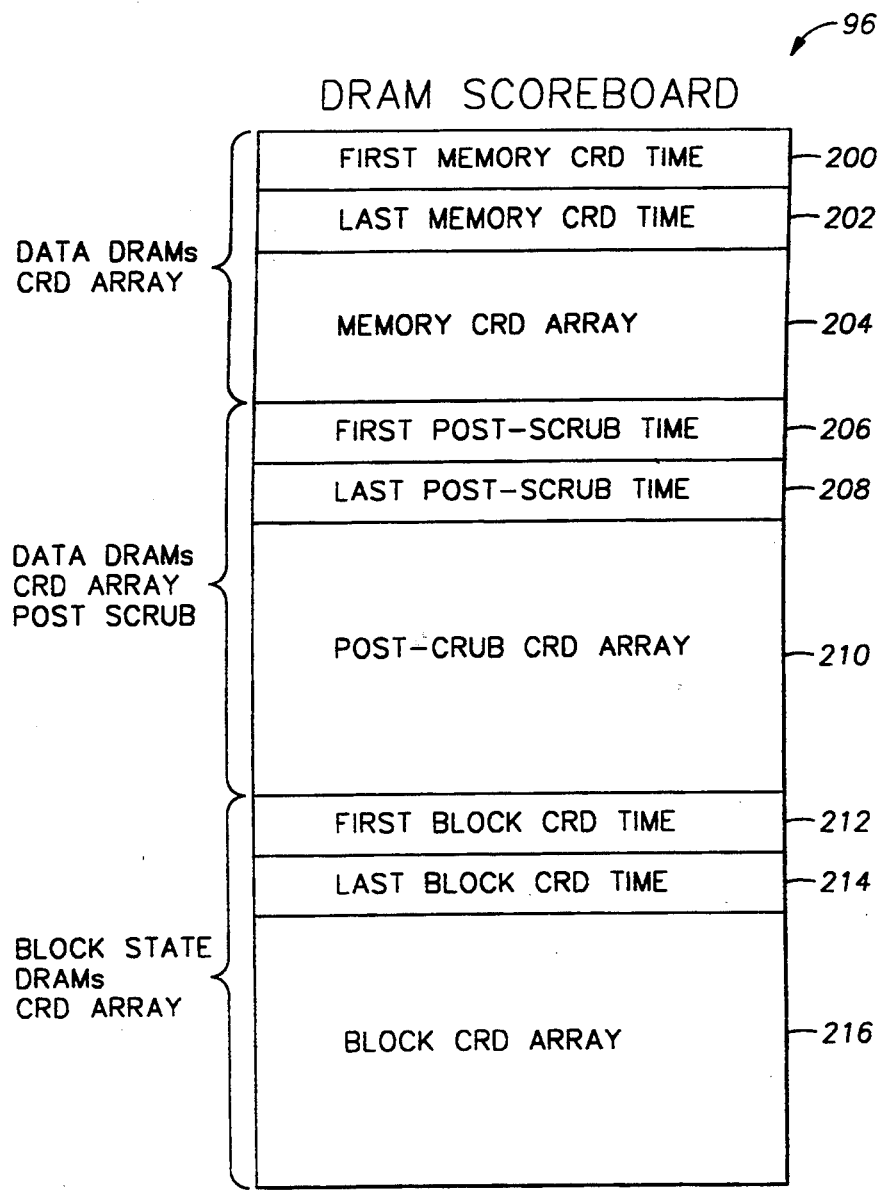
FIG. 8 illustrates preferred fields in the DRAM SCOREBOARD field illustrated in FIG. 7.

The DRAM SCOREBOARD section 96 contains information regarding DRAM correctable error performance. The DRAM SCOREBOARD section 96 is preferably 308 bytes long. The individual fields contained within the DRAM SCOREBOARD section 96 are illustrated in FIG. 8. The first area of the DRAM scoreboard section 96 includes the fields 200, 202, and 204. Information related to memory correctable read data (CRD) errors is stored in this section 96. The FIRST MEMORY CRD TIME field 200 is preferably one quadword in length and stores the time of the first memory CRD error. The LAST MEMORY CRD TIME field 202 is also one quadword in length and stores the times of the last memory CRD error. Of course, when the first memory CRD error occurs, both fields 200 and 202 will be identical. The MEMORY CRD ARRAY field 204 is an array of bits that preferably includes 128 bytes. Each bit corresponds to a unique CRD syndrome. Preferably, the MEMORY CRD ARRAY field 204 is actually organized as four arrays, where each array corresponds to a DRAM bank 108A-D. When a memory CRD error occurs, the failing bank 108 A-D and ECC syndrome are determined. The failing bank 108 A-D determines which of the four arrays within the MEMORY CRD ARRAY field 204 should be used. Once the appropriate array is selected, the ECC syndrome is used as a bit index, and the appropriate bit is set.

The next area of the DRAM SCOREBOARD section 96 includes the fields 206, 208, and 210. Information relating to memory CRD errors that occur after "scrubbing" is stored in this section. Scrubbing refers to the process of rewriting correctable memory errors. The FIRST POST-SCRUB TIME field 206, preferably one quadword in length, stores the time of the first memory CRD error that occurs after scrubbing. On systems where scrubbing is possible, e.g., where a memory location can be rewritten in an atomic deterministic way, if a CRD error having identical syndrome information occurs again within the identical bank, the time of such error reflects this first occurrence, and is stored in the field 206. The LAST POST-SCRUB TIME field 208, also preferably one quadword in length, stores the time of the last memory CRD error to occur after scrubbing. The POST-SCRUB CRD ARRAY field 210 is an array of bits, preferably including 128 bytes. The field 210 is preferably organized identical to the MEMORY CRD ARRAY field 204. Each bit within the POST-SCRUB CRD ARRAY field 210 corresponds to a unique CRD syndrome. The field 210 preferably includes four arrays which correspond to a respective DRAM bank 108A-D. When a memory CRD error occurs, and the bank and the ECC syndrome are the same as for a previously recorded CRD error that has been scrubbed, the POST-SCRUB CRD ARRAY field 210 is updated. As with the field 204, the failing bank determines which array within the field 210 should be updated. Once the appropriate array is selected, the ECC syndrome is used as a bit index, and the appropriate bit is set.

The last area of the DRAM SCOREBOARD section 96 includes the fields 212, 214, and 216. This section stores information relating to BLOCK DRAM CRD errors, which are errors in the tags used by the memory controller. The FIRST BLOCK CRD TIME field 212, preferably one quadword in length, stores the time of the first BLOCK DRAM CRD error. The LAST BLOCK CRD TIME field 214, also preferably one quadword in length, stores the time of the last BLOCK DRAM CRD error. The BLOCK CRD ARRAY field 216 is an array of bits, preferably four bytes in length. Each bit corresponds to a unique syndrome. When a BLOCK DRAM CRD error occurs, the ECC syndrome is used as a bit index, and the appropriate bit in the field 216 is set.

Figure 9:
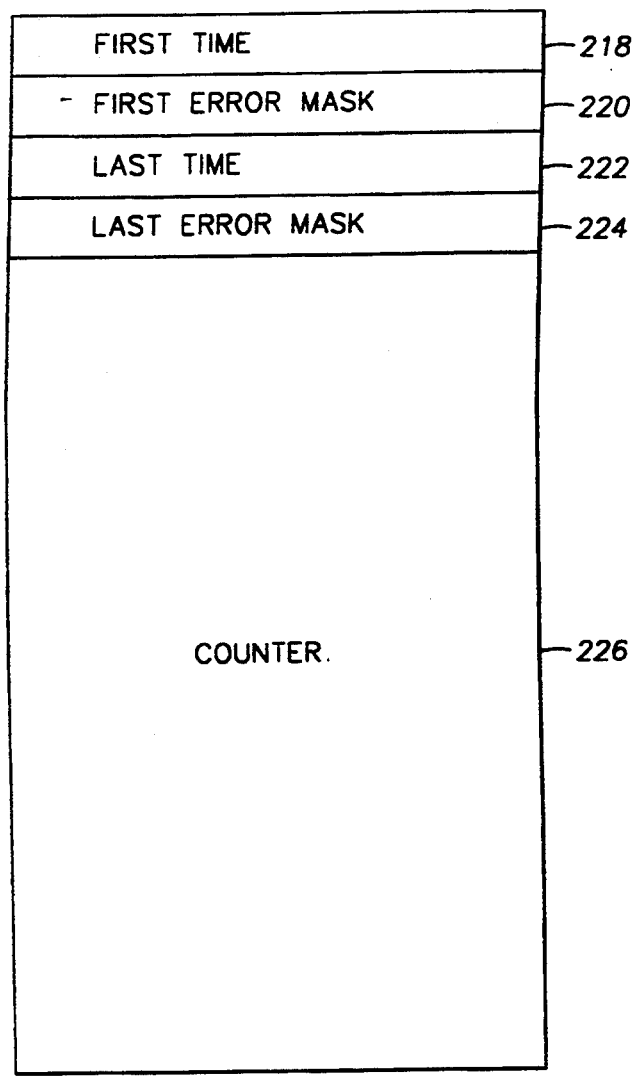
FIG. 9 illustrates preferred fields in the UNCORRECTABLE ERROR SYMPTOM TABLE field illustrated in FIG. 7.

Referring now to FIGS. 7 and 9, the UNCORRECTABLE ERROR SYMPTOM TABLE section 98 contains information regarding all memory error conditions that can be described by the error bits of the memory controller 36. The section 98 is preferably 116 bytes long. The UNCORRECTABLE ERROR SYMPTOM TABLE section 98 is illustrated in greater detail in FIG. 9. The section 98 stores information relating to uncorrectable memory errors. The FIRST TIME field 218, preferably one quadword in length, stores the time when the table 98 is first updated. The LAST TIME field 222, also preferably one quadword in length, stores the time of the last update of the field 98. The FIRST ERROR MASK field 220, preferably one quadword in length, stores a bit mask of the error conditions that correspond to the error recorded in the FIRST TIME field 218. The LAST ERROR MASK field 224, also preferably one quadword in length, stores a bit mask of the error conditions that correspond to the error recorded in the LAST TIME field 222.

Figure 10A:
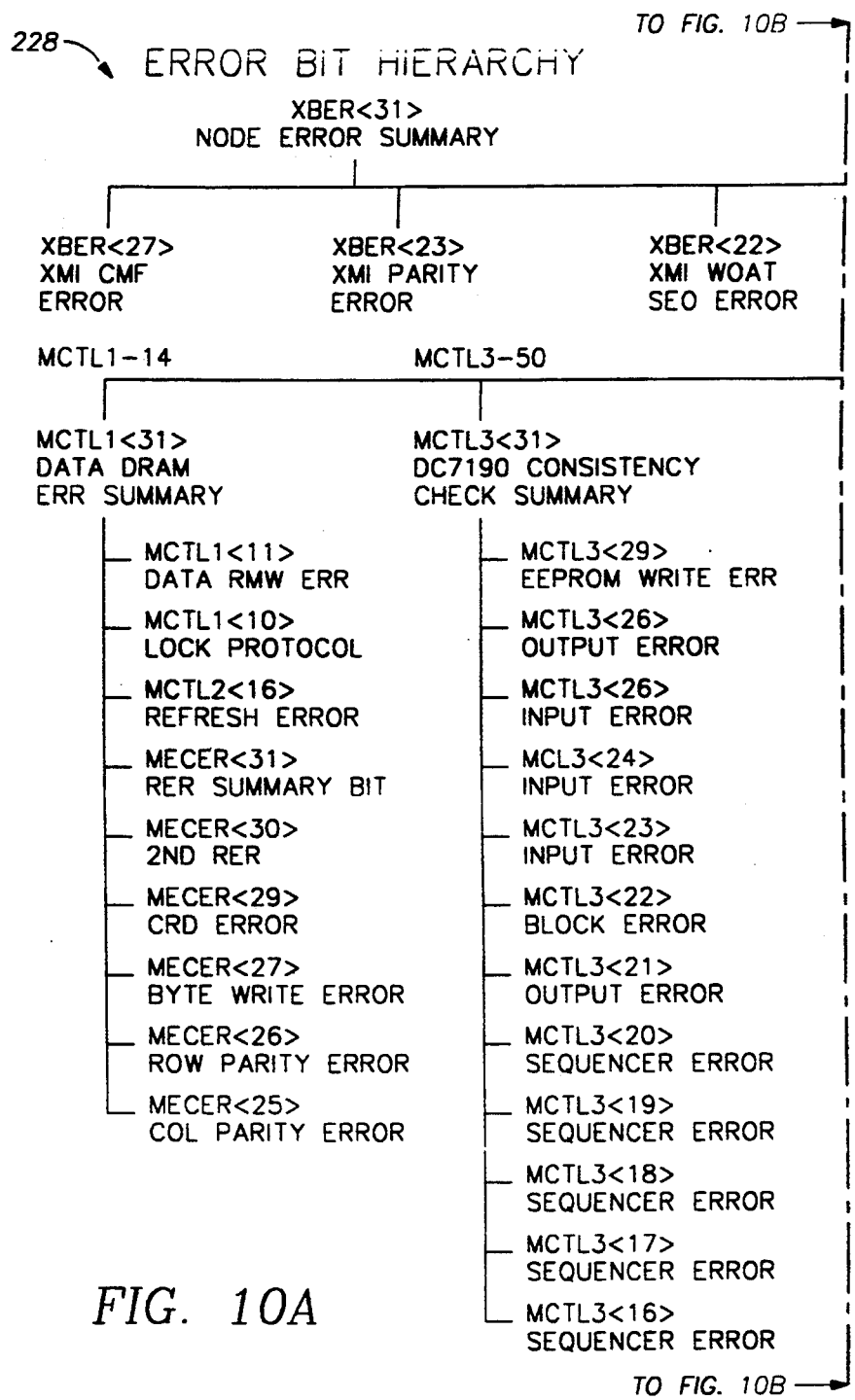
FIG. 10 illustrates an error bit hierarchy.
Figure 10B:
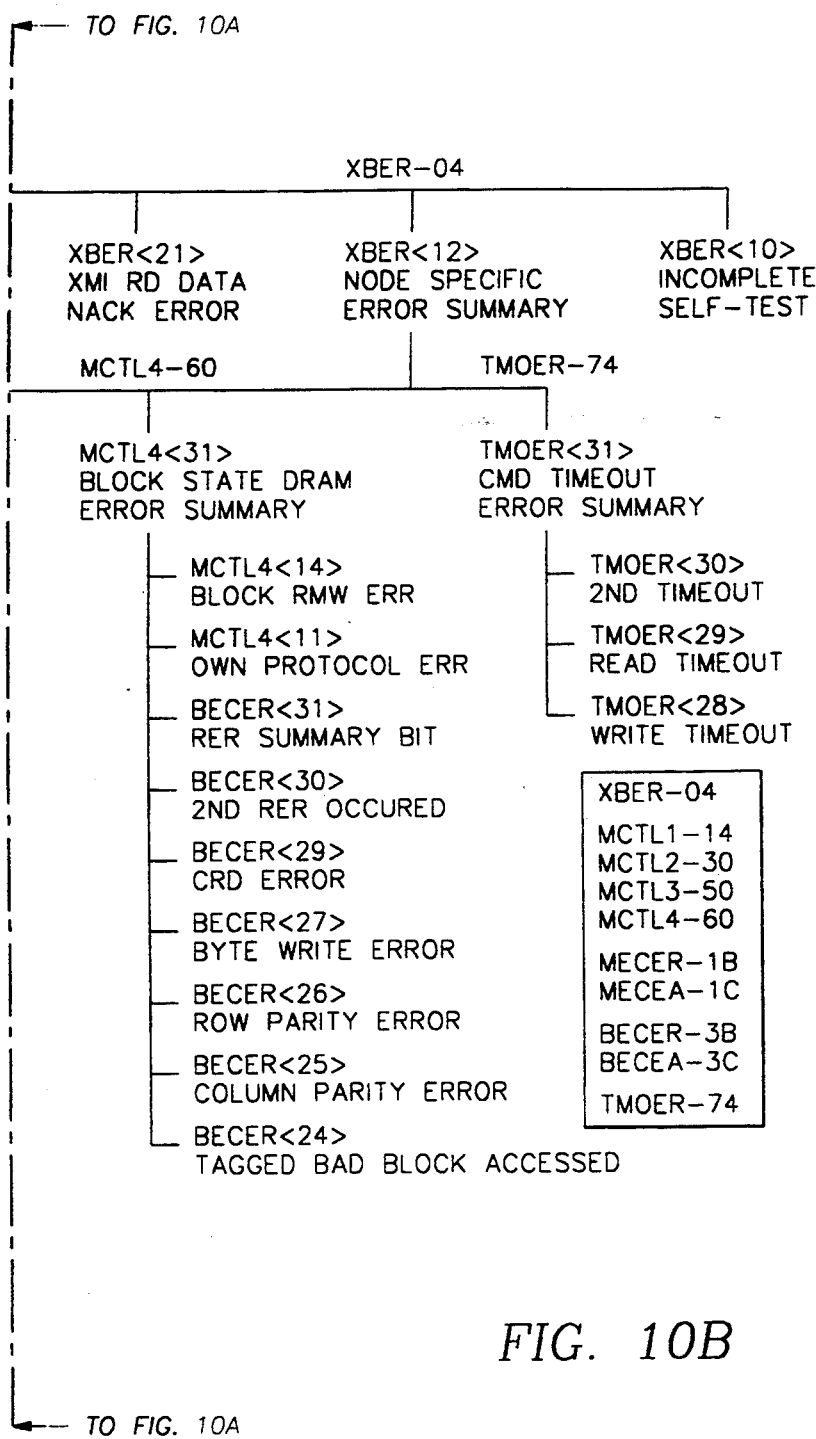

The COUNTER area 226 contains an array of counters where each counter represents an error condition that is interpreted by the operating system as a memory controller error condition. The index position of each error is preferably the bit position of the same error condition in the FIRST ERROR MASK field 220 and the LAST ERROR MASK field 224. The COUNTER area 226 is preferably 64 bytes long, and each counter is preferably one byte long. Therefore, sixty-four different memory controller error conditions may be logged in the COUNTER area 226. The diagram 228 illustrated in FIG. 10 provides an overview of the error bit hierarchy for the preferred MS65A memory controller. Thus, in the preferred embodiment, the error conditions set forth in the diagram 228 would be recorded in the respective counters of the COUNTER area 226.

The COUNTER area 226 also preferably includes seven longword counters, which are not specifically illustrated in FIG. 9.

The CC_ERROR field is a counter for detected XMI corrected confirmation errors. The PE_ERROR field is a counter for detected XMI parity errors. The WSEQ_ERROR field is a counter for detected XMI write sequence errors. The RIDNAK_ERROR field is a counter for detected XMI read/ID Noack errors. The STF_ERROR field is a counter for detected self test failures. The CRDERR_ERROR field is a counter for detected CRD errors. Finally, the BLKCRDERR_ERROR field is a counter for detected block CRD errors.

The DRAM SYMPTOM TABLE field 99 is reserved for future use by the VMS operating system. It is initialized to zero. The field 99 is preferably 568 bytes long.

As can be seen from the above description, information correlative to all three classes of memory errors can be formatted and stored in the designated area 86 for latter retrieval. This information may include, among other things, the time of an error, the operating time of the module, the time of initialization, the DRAM having a correctable error, the DRAM bank having an uncorrectable error, and reports of scrubbing of correctable errors.

When the current operating session is finally terminated, either by shutdown or by crashing, the run time of the operating session is calculated and the appropriate field in the designated area in the main memory 40 is updated. Then, the contents of the designated area in the main memory 40 are written to the appropriate EEPROM 118 in the respective memory controller 36. This cycle is continued until the memory controller 36 is removed from the computer system 10 and returned for repair.

At the repair facility, the contents of the EEPROM 118 are interrogated. The data contained in the EEPROM 118 can be used by technicians to direct repair processes and also to study the performance of memory controllers in the field. The majority of the error syndromes stored in the EEPROM 118 directly relate to a component that has failed in some way. Thus, a memory controller returned for repair can have a large number of failures diagnosed by reading the data stored in the EEPROM 118. This avoids lengthy test cycles where the possibility of reproducing previous failures is slim. Moreover, it greatly enhances the chance of detecting intermittent failures which are often virtually impossible to reproduce during laboratory testing.

We claim:

1. A computer system with error detection capabilities, comprising:
    a system bus;
    a central processing unit being coupled to said system bus and being capable of delivering signals to and receiving signals from said system bus;
    a memory controller being coupled to said system bus, said memory controller being capable of delivering signals to and receiving signals from said system bus, said memory controller having a non-volatile memory, said non-volatile memory having an area designated for storage of data correlative to detected errors;
    a main memory being coupled to said memory controller, said main memory being capable of delivering signals to and receiving signals from said memory controller; and
    error correction circuit means controlled by a program being executed by said central processing unit, said circuit for checking to verify if an error is correctable, and then collecting a detected error and storing data correlative to said detected error as a syndrome in said designated area of said non-volatile memory and said error correction circuit enabling copying said designated area into said main memory at the initiation of each operating session, said error correction circuit including means to use said syndrome to identify an area of said main memory which might have said detected error.

2. The computer system, as set forth in claim 1, wherein said error detecting and correcting circuit includes means for attaching parity bits to write data delivered from said memory controller to said main memory, checking parity bits contained in read data received from said main memory to detect an error, correcting correctable errors, and reporting detected errors.

3. The computer system, as set forth in claim 1, wherein said non-volatile memory comprises an electrically erasable programmable read only memory.

4. The computer system, as set forth in claim 1, wherein said non-volatile memory comprises:
an area designated for storage of data correlative to detected errors.

5. The computer system, as set forth in claim 4, wherein said designated area comprises:
a plurality of defined data structures, said data structures defining particular types of errors and storing data correlative to said respective particular types of errors.

6. The computer system, as set forth in claim 4, wherein said program updates said copy of said designated area in said main memory during each operating session.

7. The computer system, as set forth in claim 6, wherein said program copies said copy of said designated area in said main memory back into said nonvolatile memory at the termination of each operating session.

8. A method for recording a memory error in a computer system, said method comprising the steps of:
detecting a memory error;
determining if said detected error is correctable;
producing an error state in response to detecting said memory error if it is correctable;
collecting said error state as a syndrome;
processing said error state syndrome and updating an error count if a similar syndrome occurs;
designating an area in a non-volatile memory for storing error states;
copying said area into main memory during an operating session;
storing said error state in said area of main memory;
resetting said error state; and
copying said area of main memory into said designated area of said non-volatile memory.

9. The method, as set forth in claim 8, wherein said step of detecting comprises the step of:
checking parity bits contained in data read from a main memory to determine whether said data contains a memory error.

10. The method, as set forth in claim 8, wherein said step of producing comprises the step of:
determining whether said memory error is a correctable error, an uncorrectable error, or a memory controller error.

11. The method, as set forth in claim 8, wherein said step of collecting said error state comprises the step of:
operating a program to collect said error state.

12. The method, as set forth in claim 11, wherein said step of processing said error state comprises the step of:
reporting said memory error and correcting said memory error if said memory error is correctable.

13. A method for recording a state of a memory error in a computer system, said method comprising the steps of:
determining if a detected error is correctable;
designating an area of a non-volatile memory for storage of data correlative to a correctable memory error;
copying said area into a volatile memory;
detecting a correctable memory error;
storing cumulative data correlative to said memory error in the form of a syndrome in said area in said volatile memory; and
copying said area in said volatile memory into said non-volatile memory for storage of said data correlative to said memory error.

14. The memory controller, comprising:
a gate array being adapted to couple to a main memory unit, said gate array delivering control signals and write data to said main memory unit and receiving read data from said main memory unit;
an interfacing unit being coupled to said gate array and being adapted to couple to a system bus, said interfacing unit delivering signals from said system bus to said gate array and delivering signals from said gate array to said system bus; and
a non-volatile memory being coupled to said gate array, said non-volatile memory storing information correlative to detected memory errors; and
wherein said gate array comprises:
an input command queue coupled to said interfacing unit and configured to receive an input command from said interfacing unit;
an input data queue coupled to said interfacing unit and configured to receive data from said interfacing unit;
a data mask/merge circuit coupled to said input command queue and said input data queue and configured to receive said input command from said input command queue and said data from said input data queue, said data mask/merge circuit generating a merged-data output;
an error correction code generator circuit coupled to said data mask/merge circuit and said main memory unit and configured to receive said merged-data output from said data mask/merge circuit and to send data coupled to an error correction code to said main memory unit;
an error correction code checking circuit coupled to said main memory unit and said data mask/merge circuit and configured to receive said data coupled to said error correction code from said main memory unit and to send said data to said data mask/merge circuit only if the error correction code is proper;
an output data queue coupled to said interfacing unit and said error correction code checking circuit and configured to receive said data from said error correction code checking circuit and to send said data to said interfacing unit; and
a register coupled to said interfacing unit and said main memory unit and configured to facilitate data transfer between said main memory unit and said non-volatile memory.

* * * * *